United States Patent
Abe

(10) Patent No.: US 10,554,322 B2
(45) Date of Patent: Feb. 4, 2020

(54) OPTICAL CONTROL DEVICE AND OPTICAL BRANCHING DEVICE

(71) Applicant: NEC Corporation, Minato-ku, Tokyo (JP)

(72) Inventor: Ryota Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/079,610

(22) PCT Filed: Mar. 9, 2017

(86) PCT No.: PCT/JP2017/009383
§ 371 (c)(1),
(2) Date: Aug. 24, 2018

(87) PCT Pub. No.: WO2017/159519
PCT Pub. Date: Sep. 21, 2017

(65) Prior Publication Data
US 2019/0058541 A1 Feb. 21, 2019

(30) Foreign Application Priority Data
Mar. 14, 2016 (JP) .................................. 2016-049911

(51) Int. Cl.
*H04J 14/02* (2006.01)
*H04B 10/296* (2013.01)
*H04B 10/294* (2013.01)

(52) U.S. Cl.
CPC ........ *H04J 14/0212* (2013.01); *H04B 10/296* (2013.01); *H04B 10/2941* (2013.01); *H04J 14/0278* (2013.01)

(58) Field of Classification Search
CPC .. H04B 10/03; H04B 10/2941; H04B 10/296; H04J 14/02; H04J 14/0212; H04J 14/0278
(Continued)

(56) References Cited

U.S. PATENT DOCUMENTS 7,326,916 B2 * 2/2008 Sugiyama ............ H04B 10/032
250/227.14
8,331,787 B2 12/2012 Noma et al.
(Continued)

FOREIGN PATENT DOCUMENTS

JP      11346188 A   *   12/1999
JP      H11-346188 A     12/1999
(Continued)

OTHER PUBLICATIONS

International Search Report for PCT Application No. PCT/JP2017/009383, dated Jun. 13, 2017.
(Continued)

*Primary Examiner* — Amritbir K Sandhu

(57) ABSTRACT

In order to provide a feature with which it is possible to suppress the occurrence of an optical surge independently of the type of optical switch, there is provided an optical control device for processing inputted first light and outputting second light, wherein the optical control device is provided with: a switching unit for switching and outputting first light that has undergone a selected process; and a variable output unit connected in series to the switching unit, the variable output unit operating so as to reduce the optical power of the second light before switching by the switching unit is executed and to gradually increase the optical power of the second light after the switching is executed.

16 Claims, 11 Drawing Sheets

(58) Field of Classification Search
USPC .......................................... 398/43, 45, 83, 85
See application file for complete search history.

(56) References Cited

U.S. PATENT DOCUMENTS

| | | | |
|---|---|---|---|
| 9,203,510 B2* | 12/2015 | Zhang | G01M 11/3109 |
| 2005/0135807 A1* | 6/2005 | Fujita | H04J 14/02 |
| | | | 398/45 |
| 2007/0138417 A1* | 6/2007 | Sugiyama | H04B 10/032 |
| | | | 250/551 |
| 2011/0019995 A1* | 1/2011 | Suzuki | H04B 10/27 |
| | | | 398/29 |
| 2012/0177362 A1* | 7/2012 | Zhang | H04B 10/0773 |
| | | | 398/9 |
| 2013/0315591 A1 | 11/2013 | Inoue | |
| 2016/0134360 A1* | 5/2016 | Tokura | H04B 10/032 |
| | | | 398/5 |

FOREIGN PATENT DOCUMENTS

| | | |
|---|---|---|
| JP | 2000-354006 A | 12/2000 |
| JP | 2007-067758 A | 3/2007 |
| WO | 2003/105496 A1 | 12/2003 |

OTHER PUBLICATIONS

English translation of Written opinion for PCT Application No. PCT/JP2017/009383, dated Aug. 24, 2018.
Extended European Search Report for EP Application No. EP17766520.5 dated Oct. 17, 2019.

* cited by examiner

FIG. 4

| | WAVELENGTH BAND TRANSMITTED IN FIRST STATE | WAVELENGTH BAND TRANSMITTED IN SECOND STATE |
|---|---|---|
| TERMINAL STATION 12 TO TERMINAL STATION 11 | A, B | A |
| TERMINAL STATION 12 TO TERMINAL STATION 13 | NONE | B |

FIG. 8

| | WAVELENGTH BAND TRANSMITTED IN THIRD STATE | WAVELENGTH BAND TRANSMITTED IN FOURTH STATE |
|---|---|---|
| TERMINAL STATION 11 TO TERMINAL STATION 12 | C, D | C |
| TERMINAL STATION 13 TO TERMINAL STATION 12 | NONE | D |

OPTICAL CONTROL DEVICE AND OPTICAL BRANCHING DEVICE

This application is a National Stage Entry of PCT/JP2017/009383 filed on Mar. 9, 2017, which claims priority from Japanese Patent Application 2016-049911 filed on Mar. 14, 2016, the contents of all of which are incorporated herein by reference, in their entirety.

TECHNICAL FIELD

The present invention relates to an optical control device and an optical branching device capable of suppressing an optical surge caused by switching of an optical signal.

BACKGROUND ART

An optical communication system using a submarine cable (hereinafter referred to as a "submarine cable system") requires flexible network construction capable of reducing an influence on communication when a trouble occurs in the submarine cable, changing a future network configuration, and the like. As one example of the solution, there is a method of disposing an optical filter and an optical switch in a submarine branching device, combining the optical filter and the optical switch, and changing an add/drop ratio of an optical signal by remote control.

FIG. 10 is a block diagram illustrating a configuration of a general submarine cable system 90. The submarine cable system 90 includes a submarine branching device 900, terminal stations 901 to 903, and submarine repeaters 904 to 906. The terminal stations 901 to 903 are devices that are installed on land and terminate submarine cables. The submarine branching device 900 and the submarine repeaters 904 to 906 are installed on the seabed. For transmitting data, in the submarine cable system 90, a wavelength division multiplexing (WDM) signal is transmitted by an optical fiber built in the submarine cable. The submarine branching device 900 and the terminal stations 901 to 903 perform interactive transmission of the WDM signal therebetween. The submarine repeaters 904 to 906 each amplify an optical signal propagating between the terminal stations 901 to 903 and the submarine branching device 900 by a built-in optical amplifier.

The submarine branching device 900 includes optical filter modules 911 to 914 and optical couplers 931 and 932. The optical filter modules 911 to 914 each include an optical switch and a plurality of optical filters inside. The optical switch switches an optical path to the plurality of optical filters.

The WDM signal sent from the terminal station 902 is amplified by the submarine repeater 905 and received by the submarine branching device 900. The received WDM signal is branched into two signals by the optical coupler 931 and the signals are input to the optical filter modules 911 and 912.

The optical filter modules 911 and 912 each switch the optical filter to be used by the optical switch. Therefore, a combination of wavelength bands of a WDM signal transmitted from the terminal station 902 to the terminal station 901 and the terminal station 903 can be changed by controlling the optical filter modules 911 and 912. For example, the WDM signal sent from the terminal station 902 can be controlled in such a way that all the WDM signals are sent to the terminal station 901 by controlling the optical filter modules 911 and 912. Alternatively, the WDM signal sent from the terminal station 902 can be controlled in such a way that an optical signal as a part of wavelengths of the WDM signal is sent to the terminal station 901 and an optical signal as the rest of wavelengths is sent to the terminal station 903.

On the other hand, the WDM signals sent from the terminal station 901 and the terminal station 903 are respectively amplified by the submarine repeaters 904 and 906 and received by the submarine branching device 900. The received WDM signals are subjected to processing by the optical filter modules 913 and 914, coupled by the optical coupler 931, and sent to the terminal station 902.

The optical filter modules 913 and 914 can switch a combination of wavelength bands of the WDM signals transmitted from the terminal station 901 and the terminal station 903 to the terminal station 902. For example, control can be performed in such a way that only the WDM signal sent from the terminal station 901 is sent to the terminal station 902 by controlling the optical filter modules 913 and 914. Alternatively, control can be performed in such a way that an optical signal as a part of wavelengths of the WDM signal sent from the terminal station 901 and an optical signal as a part of wavelengths of the WDM signal sent from the terminal station 903 are coupled and sent to the terminal station 902.

In other words, an add/drop ratio of the submarine branching device 900 can be changed by controlling the optical filter modules 911 to 914.

In relation to the present invention, PTL 1 describes a technique for suppressing occurrence of an optical surge during a switch operation by setting a time constant to be greater in an operation of an optical switch.

CITATION LIST

Patent Literature

PTL 1: Japanese Unexamined Patent Application Publication No. 2000-354006 (paragraph [0133])

SUMMARY OF INVENTION

Technical Problem

When the optical switches built in the optical filter modules 911 to 914 described in FIG. 10 are each used to switch an optical path, the optical switches cause instantaneous interruption. Then, a rise in optical power of an optical signal output from each of the optical filter modules 911 to 914 after the instantaneous interruption is steep. Such a steep rise in optical power after the instantaneous interruption has been known as causing an optical surge (instantaneous light having high power) in an optical amplifier provided in equipment (for example, the submarine repeaters 904 to 906 in FIG. 10) on a subsequent stage of the optical filter modules 911 to 914. In general, a faster response speed of the optical switch increases an amount of optical surges due to switching. Thus, when an optical path is switched by using a high-speed optical switch, an optical surge occurring in a device on a subsequent stage is input to another device, and, as a result, the another device may not normally operate.

FIG. 11 is a diagram illustrating an example of an optical waveform output from an optical amplifier included in the submarine repeater 904 on a subsequent stage when a switching speed of the optical switch is fast in the optical filter module 911. Light input from the submarine branching device 900 is interrupted once at an instant when an optical path is switched to another optical filter inside the optical filter module 911 from a state (a in FIG. 11) where an optical signal is transmitted with fixed optical power from the terminal station 902 to the terminal station 901. As a result, optical output power of the submarine repeater 904 decreases (b in FIG. 11). When an optical signal is input on a steep rising edge to the submarine repeater 904 in a non-signal input state due to switching of the optical filter inside the optical filter module 911, an optical surge occurs in the optical amplifier of the submarine repeater 904 (c in FIG. 11). After occurrence of the optical surge, the optical output power of the submarine repeater 904 becomes fixed (d in FIG. 11). At occurrence of the optical surge, an optical signal having high power is input to another submarine repeater prior to the submarine repeater 904 and the terminal station 901, and the equipment may not normally operate.

In relation to such an optical surge occurring due to switching by an optical switch, PTL 1 describes a technique for suppressing occurrence of an optical surge by setting a time constant to be greater in an operation itself of an optical switch. However, the technique described in PTL 1 is only applicable to an optical switch capable of setting any time constant of an operation. In other words, the technique described in PTL 1 has a problem that an optical switch to which the technique is applicable is limited.

OBJECT OF INVENTION

An object of the present invention is to provide a technique capable of suppressing occurrence of an optical surge without depending on a type of optical switch.

Solution to Problem

An optical control device according to the present invention is an optical control device configured to process input first light and output second light, and includes: a switching unit configured to switch and output the first light subjected to selected processing; and a variable output unit configured to operate in such a way as to reduce optical power of the second light before switching by the switching unit is executed and gradually increase the optical power of the second light after the switching is executed, the variable output unit being connected in series to the switching unit.

An optical control method according to the present invention is an optical control method for processing first light and outputting second light, and includes: switching and outputting the first light subjected to selected processing; reducing optical power of the second light before switching is executed; and gradually increasing the optical power of the second light after the switching is executed.

Advantageous Effects of Invention

The present invention is able to suppress occurrence of an optical surge without depending on a type of optical switch.

BRIEF DESCRIPTION OF DRAWINGS

FIG. 4 is a diagram illustrating an example of wavelength bands of a WDM signal transmitted to a terminal station 11 and a terminal station 13 in a downstream channel.

FIG. 8 is a diagram illustrating an example of wavelength bands of WDM signals transmitted from the terminal station 11 and the terminal station 13 to a terminal station 12 in an upstream channel.

EXAMPLE EMBODIMENT

Example embodiments of the present invention will be described below. Note that, an arrow provided in a diagram illustrating an example of a configuration of an example embodiment indicates an example of a direction of a signal, and does not limit a type and a direction of the signal.

First Example Embodiment

Figure 1:
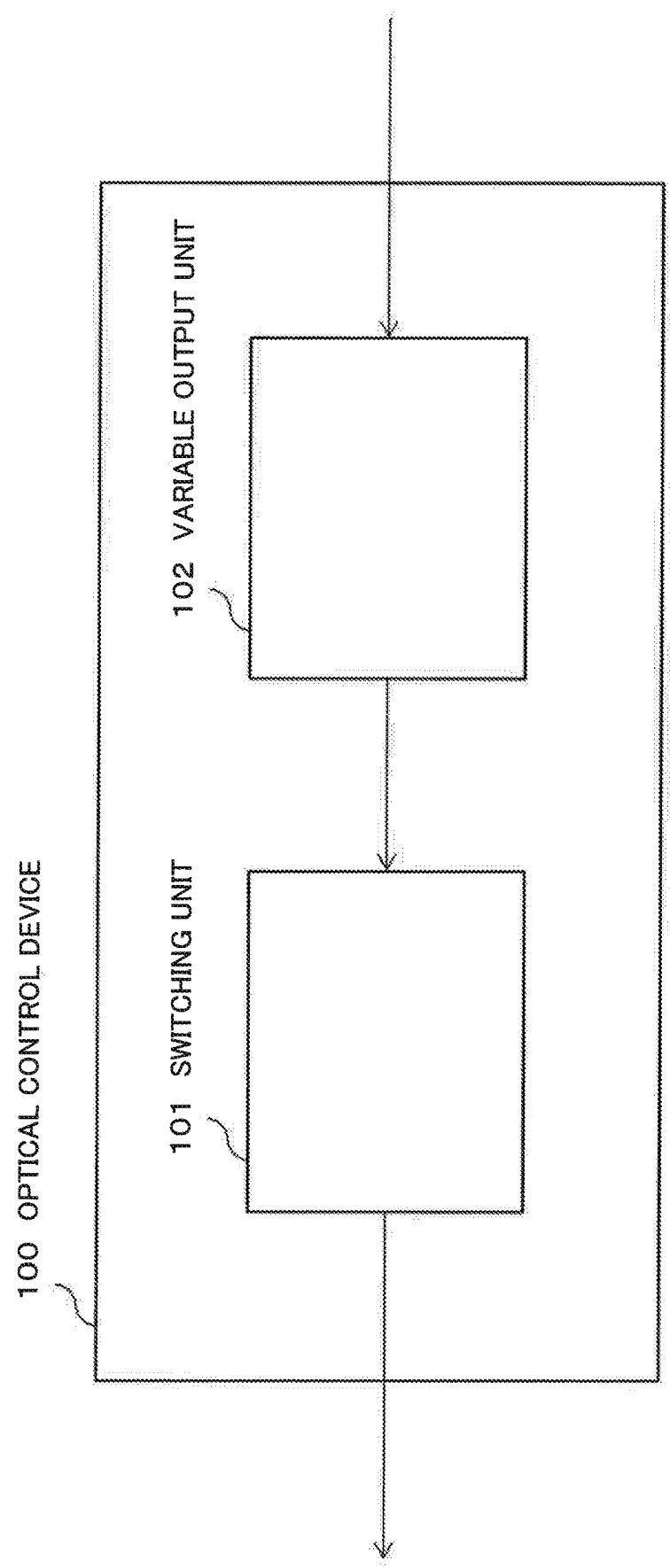
FIG. 1 is a block diagram illustrating an example of a configuration of an optical control device 100 in a first example embodiment.

FIG. 1 is a block diagram illustrating an example of a configuration of an optical control device 100 in a first example embodiment of the present invention. The optical control device 100 receives an input of first light and outputs second light. The optical control device 100 includes a switching unit 101 and a variable output unit 102. The switching unit 101 includes, for example, a plurality of optical paths inside, switches the first light input to the optical control device 100 in such a way that the first light passes through any one of the optical paths inside, and outputs the first light. The variable output unit 102 is connected in series to the switching unit 101, reduces optical power of the second light being light output from the optical control device 100 before the switching by the switching unit 101 is executed, and gradually increases the optical power of the second light after the switching is executed. In the optical control device 100, connection is made in such a way that an output of the variable output unit 102 is input to the switching unit 101.

Figure 2:
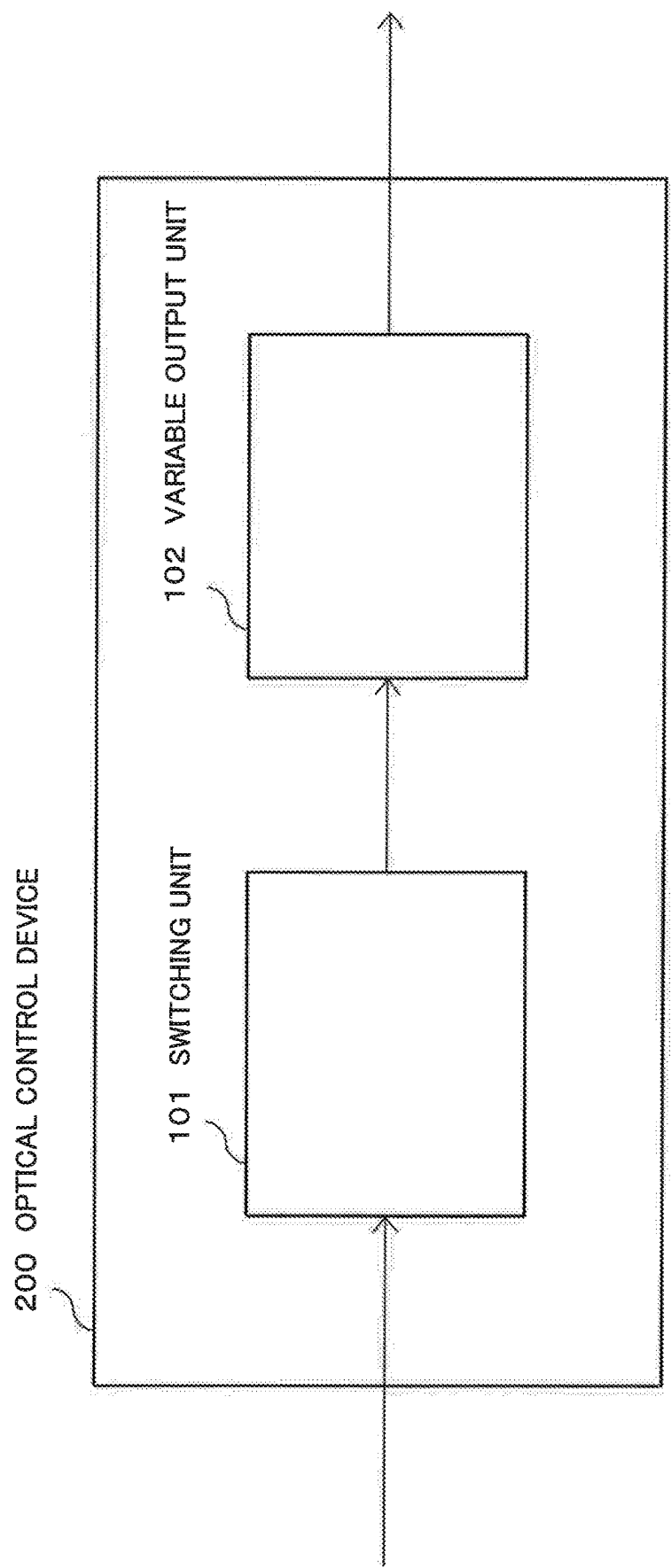
FIG. 2 is a block diagram illustrating an example of a configuration of an optical control device 200 in the first example embodiment.

FIG. 2 is a block diagram illustrating an example of a configuration of an optical control device 200 in the first example embodiment of the present invention. In the optical control device 200, connection is made in such a way that an output of the switching unit 101 is input to the variable output unit 102 in a direction contrary to the optical control device 100 in FIG. 1.

Both of the optical control devices 100 and 200 having such configurations reduce the optical power of the second light being output light of the optical control devices 100 and 200 before the switching by the switching unit 101, and gradually increase (that is, slowly increases) the optical power of the second light after the switching. Thus, even when an optical amplifier is connected to a subsequent stage of each of the optical control devices 100 and 200, the optical control devices 100 and 200 can suppress occurrence of an optical surge by the optical amplifier without depending on a configuration of the switching unit.

Second Example Embodiment

Figure 3:
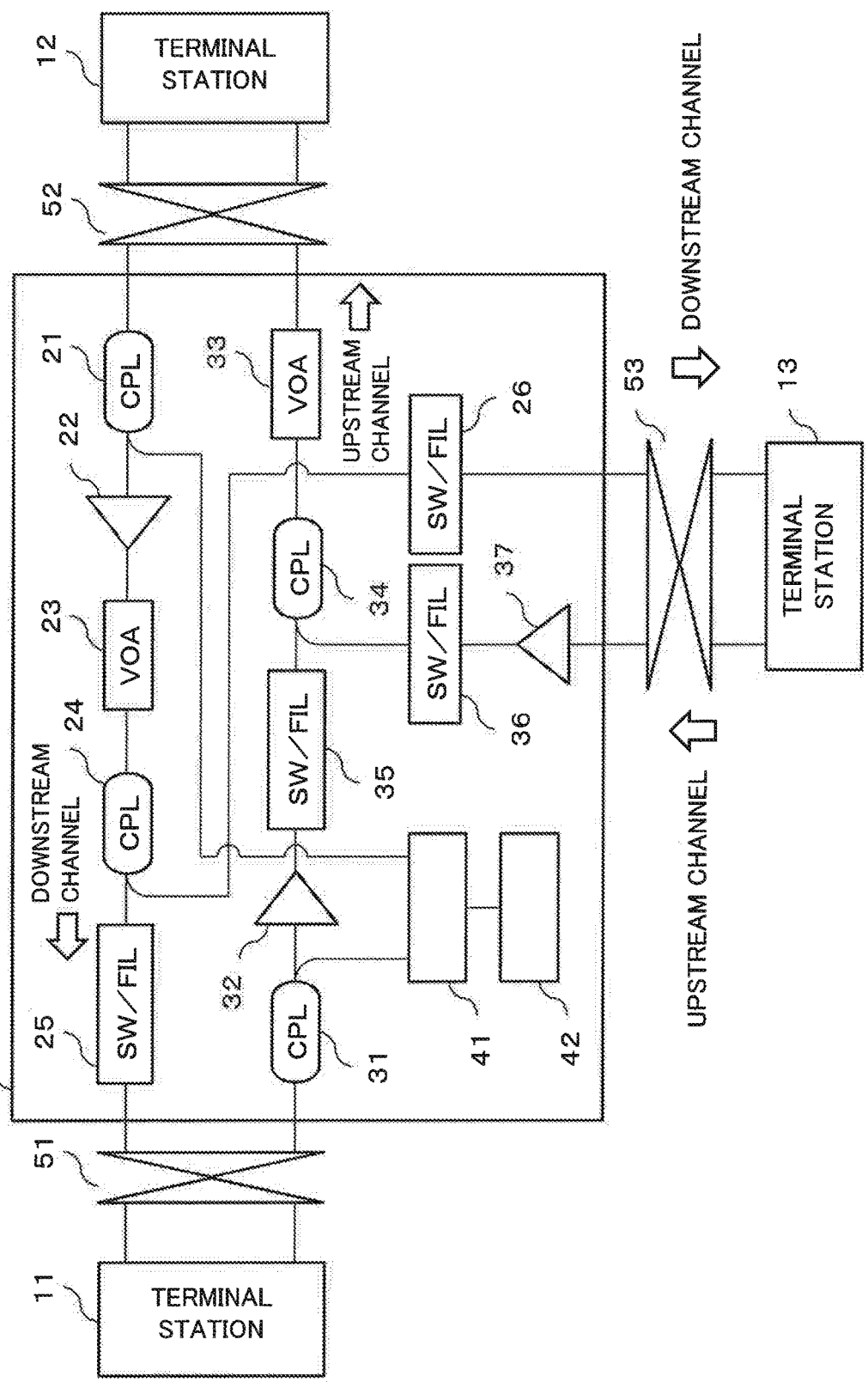
FIG. 3 is a diagram illustrating an example of a configuration of a submarine cable system 1 in a second example embodiment.

FIG. 3 is a diagram illustrating an example of a configuration of a submarine cable system 1 in a second example embodiment of the present invention. The submarine cable system 1 includes terminal stations 11 to 13, a submarine branching device 10, and submarine repeaters 51 to 53. The terminal stations 11 to 13 are installed on land and perform interactive transmission of WDM signals each other via the submarine branching device 10. The submarine repeaters 51 to 53 are installed between the submarine branching device 10 and the corresponding terminal stations 11 to 13. The submarine repeaters 51 to 53 each include an optical amplifier and amplify an optical signal propagating between the corresponding terminal stations 11 to 13 and the submarine branching device 10. A plurality of submarine repeaters may be connected in series between the submarine branching device 10 and the terminal stations 11 to 13.

The submarine branching device 10 receives a WDM signal sent from the terminal station 12, switches the optical signal by wavelength band basis, branches the optical signal to the terminal station 11 and the terminal station 13, and outputs the optical signals. Further, the submarine branching device 10 receives WDM signals sent from the terminal station 11 and the terminal station 13, couples signals in wavelength bands selected from the respective received signals, and outputs the signal to the terminal station 12. In the present example embodiment, a transmission direction from the terminal station 12 to the terminal stations 11 and 13 is described as "downstream", and a transmission direction from the terminal stations 11 and 13 to the terminal station 12 is described as "upstream". An optical signal of one or a plurality of carriers is disposed in one wavelength band.

The submarine branching device 10 includes optical couplers 21, 24, 31, and 34, optical amplifiers 22, 32, and 37, variable optical attenuators 23 and 33, and optical filter modules 25, 26, 35, and 36. The submarine branching device 10 further includes a reception unit 41 and a control unit 42. Note that, CPL in the diagram is an abbreviation of "coupler", VOA is an abbreviation of "variable optical attenuator", and SW/FIL is an abbreviation of "switch/filter".

The optical couplers 21, 24, 31, and 34 are 1×2 optical directional couplers that couple optical signals or split an optical signal. The optical amplifiers 22 and 32 are optical fiber amplifiers that amplify an optical signal by energy of excitation light generated by an excitation light source. Optical output power of the optical amplifiers 22, 32, and 37 can be changed by controlling optical power of the excitation light. The variable optical attenuators 23 and 33 are optical attenuators capable of controlling an amount of attenuation. The optical filter modules 25, 26, 35, and 36 are optical devices capable of controlling a transmission band of a WDM signal. A configuration of the optical filter modules 25, 26, 35, and 36 will be described later.

The reception unit 41 performs optical-electrical (O/E) conversion on optical signals branched by the optical couplers 21 and 31 and outputs the converted electric signals to the control unit 42. The control unit 42 monitors and controls the entire submarine branching device 10. For example, the control unit 42 generates a control command (command) for controlling the submarine branching device 10 based on the electric signals input from the reception unit 41.

The control command controls the variable optical attenuators 23 and 33 and the optical filter modules 25, 26, 35, and 36. The control command may further generate a command for controlling optical output power of the optical amplifiers 22, 32, and 37. The control command may be included in a control signal included in the WDM signals sent from the terminal stations 11 and 12, and be transmitted. For example, the control signal may be transmitted at a wavelength different from that of a main signal or may be superimposed on a main signal and transmitted. The procedure of transmitting a control signal by using a WDM signal is known, so that detailed description will be omitted.

(Description of Processing of Signal in Downstream Channel)

Processing of an optical signal in the downstream channel sent from the terminal station 12 in the submarine branching device 10 will be described. The terminal station 12 sends a WDM signal having a wavelength band A and a wavelength band B that do not overlap each other. The wavelength bands A and B are wavelength ranges in which wavelengths of a WDM signal are divided in such a way as not to overlap each other. For example, the wavelength band A may be from 1530 nm to 1545 nm and the wavelength band B may be from 1550 nm to 1565 nm, which are not limited thereto. Each of the wavelength bands may include a plurality of optical signals having different carrier frequencies. In the downstream channel of the present example embodiment, the submarine branching device 10 switches between a first state where signals in the wavelength bands A and B received from the terminal station 12 are output to only the terminal station 11 and a second state where a signal in the wavelength band A is output to the terminal station 11 and a signal in the wavelength band B is output to the terminal station 13.

The WDM signal sent from the terminal station 12 is amplified by the submarine repeater 52 and received by the submarine branching device 10. The received WDM signal passes through the optical coupler 21 and is amplified by the optical amplifier 22. A part of the WDM signal is split by the optical coupler 21 and received by the reception unit 41. When a control signal is included in the WDM signal received from the terminal station 12, the reception unit 41 and the control unit 42 generate a control command based on the control signal.

The WDM signal amplified by the optical amplifier 22 passes through the variable optical attenuator 23 and is split into the direction of the terminal station 11 and the direction of the terminal station 13 by the optical coupler 24. An amount of attenuation of the variable optical attenuator 23 is controlled by the control command notified from the control unit 42. The WDM signal split into the direction of the terminal station 11 in the optical coupler 24 is input to the optical filter module 25. The WDM signal split into the direction of the terminal station 13 in the optical coupler 24 is input to the optical filter module 26. The optical filter modules 25 and 26 each select the input WDM signal by wavelength band basis and output the WDM signal.

FIG. 4 is a diagram illustrating an example of wavelength bands of a WDM signal transmitted from the terminal station 12 to the terminal station 11 and the terminal station 13 in the downstream channel. In the first state, the optical filter module 25 allows both of optical signals in the wavelength band A and the wavelength band B to pass therethrough and outputs the optical signals to the submarine repeater 51. Then, in the first state, the optical filter module 26 blocks both of the optical signals in the wavelength band A and the wavelength band B. In other words, in the first state, all the WDM signals sent from the terminal station 12 are transmitted to the terminal station 11, and are not transmitted to the terminal station 13.

In the second state, the optical filter module 25 allows only an optical signal in the wavelength band A to pass therethrough and outputs the optical signal to the submarine repeater 51, and blocks an optical signal in the wavelength band B. On the other hand, in the second state, the optical filter module 26 allows the optical signal in the wavelength band B to pass therethrough and outputs the optical signal to the submarine repeater 53 while blocking the optical signal in the wavelength band A. In other words, in the second state, a signal in the wavelength band A of the WDM signal output from the terminal station 12 is transmitted to the terminal station 11, and a signal in the wavelength band B is transmitted to the terminal station 13.

In the first state, the optical filter modules 25 and 26 are controlled almost simultaneously, and thereby the downstream channel of the submarine branching device 10 shifts to the second state. In this way, the submarine branching device 10 can switch a drop ratio of the input WDM signal by wavelength band basis and change the drop ratio.

Figure 5:
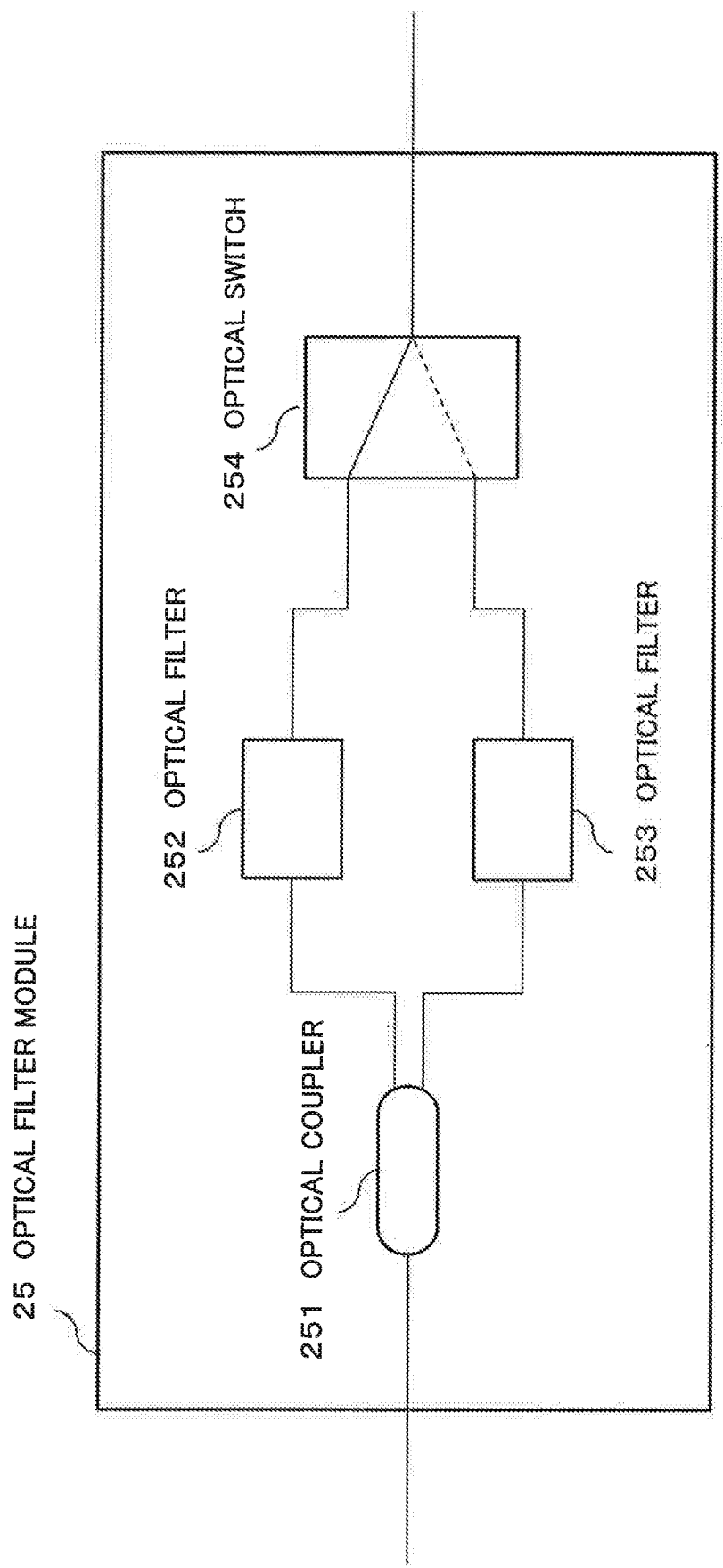
FIG. 5 is a block diagram illustrating an example of a configuration of an optical filter module 25.

The optical filter module 25 will be described below. FIG. 5 is a block diagram illustrating an example of a configuration of the optical filter module 25. The optical filter module 25 will be described referring FIG. 5, and the configuration illustrated in FIG. 5 is also applied to the optical filter modules 26, 35, and 36 except for characteristics of a filter.

The optical filter module 25 includes an optical coupler 251, optical filters 252 and 253, and an optical switch 254. The optical coupler 251 is, for example, a 1×2 optical directional coupler. The optical switch 254 is, for example, a 1×2 optical switch, and a switching direction is controlled by the control unit 42. In the optical filter module 25, the optical filter 252 is an optical filter that allows light in the wavelength bands A and B to pass therethrough. The optical filter 253 is an optical filter that allows light in the wavelength band A to pass therethrough and blocks light in the wavelength band B.

In the first state, an optical path of the optical switch 254, as indicated by the solid line in FIG. 5, is connected to the optical filter 252. Therefore, light input from the outside of the optical filter module 25 to the optical switch 254 passes through the optical filter 252 and the optical coupler 251 and is output to the outside of the optical filter module 25. In this way, in the first state, the light in the wavelength bands A and B is output from the optical coupler 251 to the outside without any change.

On the other hand, in the second state, an optical path of the optical switch 254 as indicated by the broken line in FIG. 5 is connected to the optical filter 253. Therefore, light input from the outside of the optical filter module 25 to the optical switch 254 passes through the optical filter 253 and the optical coupler 251 and is output to the outside of the optical filter module 25. In other words, in the second state, light in the wavelength band B is blocked by the optical filter 253 and only light in the wavelength band A is output from the optical coupler 251 to the outside.

The optical filter module 26 is different from the optical filter module 25 in characteristics of the optical filters 252 and 253. In other words, the optical filter 252 used in the optical filter module 26 is an optical filter that blocks light in the wavelength bands A and B. The optical filter 253 used in the optical filter module 26 is an optical filter that allows light in the wavelength band B to pass therethrough and blocks light in the wavelength band A.

As illustrated in FIG. 4, signals in the wavelength bands A and B are output to only the terminal station 11 in the first state by the optical filter modules 25 and 26 having such configurations being controlled in a ganged manner. Then, in the second state, an optical signal in the wavelength band A is transmitted to the terminal station 11, and an optical signal in the wavelength band B is transmitted to the terminal station 13.

Note that, it is clear that the function of the optical filter module 25 illustrated in FIG. 5 described above is identical when light is input from the optical coupler 251 side and when light is input from the optical switch 254 side. In other words, a direction of an optical signal passing through the optical filter module 25 is not limited.

Herein, the optical switch 254 may be instantaneously interrupted when switching between the optical filters 252 and 253 used in the optical filter module 25. As a result, the optical amplifier on the subsequent stage may generate an optical surge, namely, instantaneous light having high power. For example, when the optical filter module 25 is controlled in such a way as to change from the first state to the second state, optical signals in the wavelength bands A and B are instantaneously interrupted, and only the signal in the wavelength band A is then output to the submarine repeater 51. Such an operation may cause the submarine repeater 51 to generate an optical surge, and other submarine repeaters and a device installed in the terminal station 11 may be damaged by the optical surge.

Thus, in the submarine branching device 10 in the present example embodiment, the variable optical attenuator 23 is controlled in such a way as to gradually increase optical power of optical signals output to the submarine repeaters 51 and 53. Specifically, the control unit 42 increases an amount of attenuation once (for example, increases an amount of attenuation to the maximum) before the optical switch 254 included in each of the optical filter modules 25 and 26 is switched. Then, the control unit 42 gradually reduces the amount of attenuation after the optical switch 254 is switched, and restores the amount of attenuation to the original amount of attenuation (for example, the minimum amount of attenuation). The control is performed by the control command output from the control unit 42.

Time needed to restore the amount of attenuation (namely, time until optical output power is increased to a predetermined value) after the optical switch 254 is switched may be set to time to the extent to which control of optical output power of the optical amplifier connected on the subsequent stage can sufficiently follow. Alternatively, a speed of increase in optical power of optical signals output to the submarine repeaters 51 and 53 may be controlled in such a way that an optical surge occurring due to switching by the optical switch 254 in the device on the subsequent stage is less than or equal to a predetermined level.

Further, time needed to increase the amount of attenuation before the optical switch 254 is switched may be shorter than time needed to gradually reduce the amount of attenuation after the switching. However, the variable optical attenuator 23 is preferably controlled in such a way that a change in optical power of optical signals to be output over time is not in a similar state to that where the optical switch is instantaneously interrupted in order to stably operate the optical amplifier on the subsequent stage.

Figure 6:
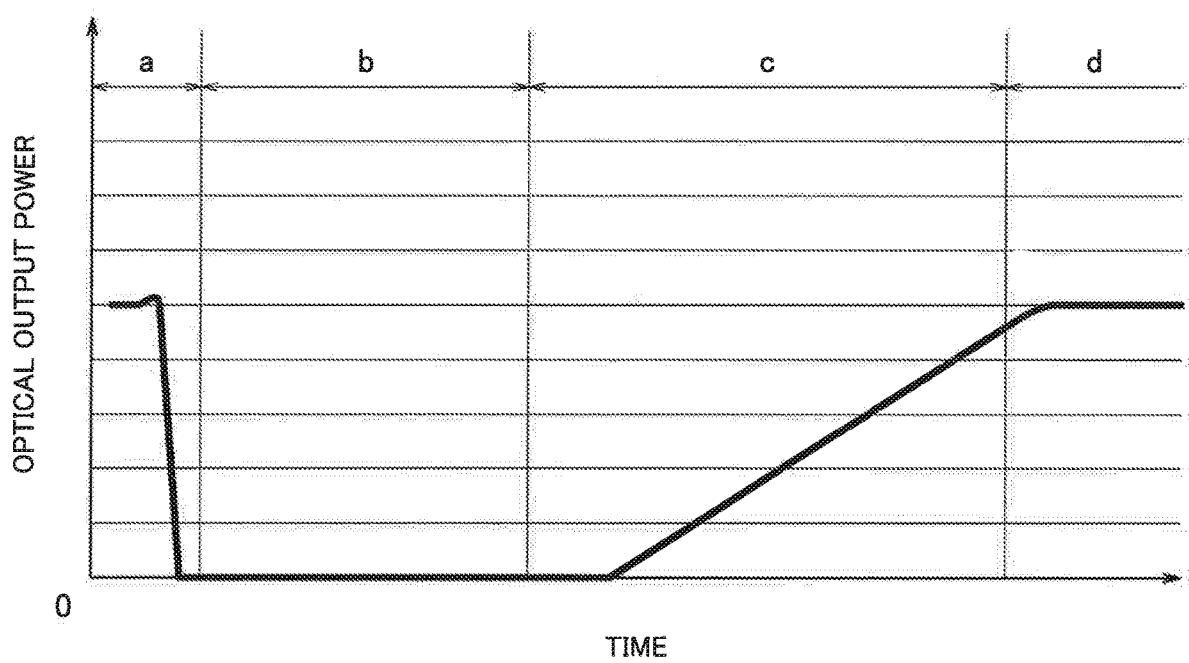
FIG. 6 is a diagram illustrating an example of a change in optical power of light output from a variable optical attenuator 23.

FIG. 6 is a diagram illustrating an example of a change in optical power of light output from the variable optical attenuator 23. The vertical axis in FIG. 6 is optical output power of the variable optical attenuator 23 and the horizontal axis is time. FIG. 6 is a diagram for describing a change in optical output power, and the optical output power and the time are arbitrary scales. In the present example embodiment, light output from the variable optical attenuator 23 is a WDM signal in the wavelength bands A and B being amplified by the optical amplifier 22.

An example of switching from the first state to the second state will be described. When the amount of attenuation of the variable optical attenuator 23 is increased prior to the switching operation of the optical filter modules 25 and 26, the optical output power decreases ("a" in FIG. 6). As a result, output of the WDM signal in the wavelength bands A and B to the submarine repeater 51 in the first state also stops. In "b" of FIG. 6, the optical output power of the variable optical attenuator 23 becomes almost zero, but the optical output power does not need to be lowered to zero as long as the effect of suppressing an optical surge can be obtained. "b" of FIG. 6 is a period of time of switching by the optical switch 254, and the optical switch 254 of each of the optical filter modules 25 and 26 is switched during b. After the switching by the optical switch 254 is completed, the amount of attenuation of the variable optical attenuator 23 is gradually reduced, and the optical output power is slowly restored to a value before the switching by the optical switch 254 ("c" to "d" in FIG. 6). The power of the optical signal in the wavelength band A output from the submarine branching device 10 to the submarine repeater 51 and the optical signal in the wavelength band B output to the submarine repeater 53 is gradually increased by the process in "c" of FIG. 6 when communication in the second state starts. Thus, occurrence of an optical surge in the submarine repeater 53 is suppressed. Note that, a decrease in the optical output power (namely, an increase in the amount of attenuation of the variable optical attenuator 23) in "a" of FIG. 6 is an example, and does not need to be steeper than a gradual increase in the optical output power (namely, a gradual decrease in the amount of attenuation of the variable optical attenuator 23) in "c" of FIG. 6.

In this way, the optical output power of the optical signals after the switching by the optical switch 254 is gradually increased by controlling the variable optical attenuator 23, and thereby occurrence of an optical surge due to the switching by the optical switch 254 can be suppressed in the device disposed on the subsequent stage of the submarine branching device 10.

Figure 7:
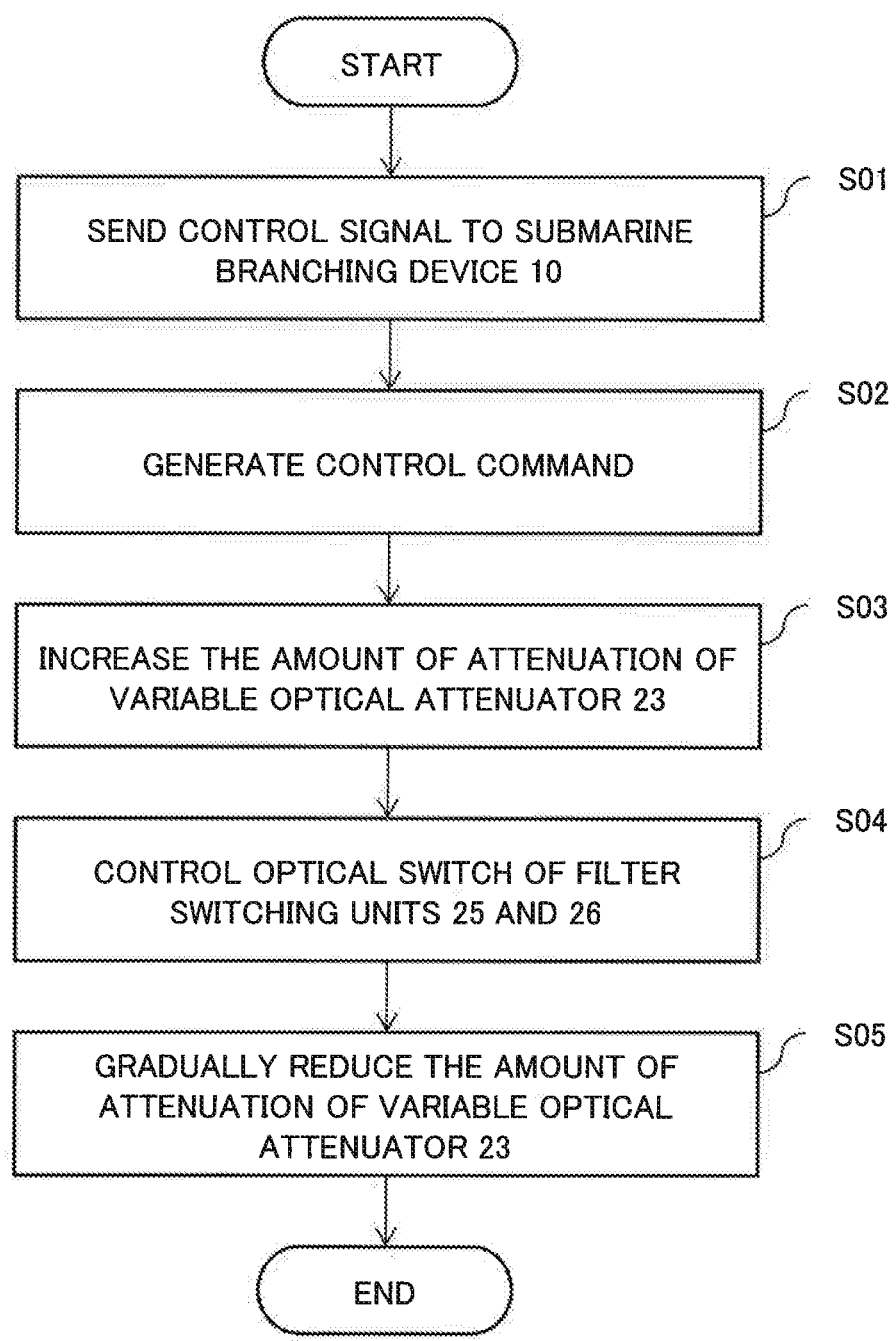
FIG. 7 is a flowchart illustrating an example of a switching procedure in the downstream channel.

FIG. 7 is a flowchart illustrating an example of a switching procedure in the downstream channel by the optical filter modules 25 and 26 described above. The terminal station 12 sends, to the submarine branching device 10, a control signal instructing control of switching by the optical filter modules 25 and 26 and the amount of attenuation of the variable optical attenuator 23 (Step S01 in FIG. 7). The control unit 42 in the submarine branching device 10 generates a control command for controlling the optical filter modules 25 and 26 and the variable optical attenuator 23 from the control signal included in the WDM signal received by the reception unit 41 (Step S02).

The control unit 42 first increases the amount of attenuation of the variable optical attenuator 23 (Step S03, "a" in FIG. 6), and then switches the optical switch 254 in each of the optical filter modules 25 and 26 (Step S04). After the switching by the optical switch 254 ends, the control unit 42 gradually reduces the amount of attenuation of the variable optical attenuator 23 (Step S05, "c" in FIG. 6).

Description of Processing of Signal in Upstream Channel

Processing of a WDM signal in the upstream channel in the submarine branching device 10 will be described. The WDM signal sent from the terminal station 12 is distributed to the terminal station 11 and the terminal station 13 in the downstream channel, whereas the WDM signals sent from the terminal station 11 and the terminal station 13 are coupled by the optical coupler 34 and sent to the terminal station 12 in the upstream channel. Thus, the WDM signals first pass through the optical filter modules 35, 36 and are then coupled by the optical coupler 34. The coupled WDM signal passes through the variable optical attenuator 33 and is output to the submarine repeater 52. Hereinafter, differences between the downstream channel and the upstream channel will be mainly described.

The WDM signal sent from the terminal station 11 is relayed by the submarine repeater 51 and received by the submarine branching device 10. The received WDM signal passes through the optical coupler 31 and is amplified by the optical amplifier 32. A part of the WDM signal is split by the optical coupler 31 and received by the reception unit 41. When a control signal is included in the WDM signal received from the terminal station 11, the reception unit 41 and the control unit 42 generate a control command based on the control signal. The WDM signal amplified by the optical amplifier 32 is processed by the optical filter module 35 and coupled to the WDM signal output from the optical filter module 36 in the optical coupler 34.

The WDM signal sent from the terminal station 13 is relayed by the submarine repeater 53 and received by the submarine branching device 10. The received WDM signal is amplified by the optical amplifier 37. The WDM signal received from the terminal station 13 and amplified by the optical amplifier 37 is processed by the optical filter module 36 and coupled to the WDM signal output from the optical filter module 35 in the optical coupler 34.

The WDM signal output from the optical coupler 34 is attenuated by a predetermined amount by the variable optical attenuator 33 and is output to the submarine repeater 52. The amount of attenuation of the variable optical attenuator 33 is controlled by the control unit 42.

The terminal stations 11 and 13 each send a WDM signal having a wavelength band C and a wavelength band D that do not overlap each other. Like the downstream channel, for example, the wavelength band C may be from 1530 nm to 1545 nm and the wavelength band D may be from 1550 nm to 1565 nm, which are not limited thereto.

In the upstream channel, a third state is a state where the submarine branching device 10 outputs only signals in the wavelength bands C and D received from the terminal station 11 as a WDM signal to only the terminal station 12. In a fourth state, a signal in the wavelength band C received from the terminal station 11 is coupled to a signal in the wavelength band D received from the terminal station 13. Then, the submarine branching device 10 outputs the coupled signal as the WDM signal in the wavelength bands C and D to the terminal station 12.

FIG. 8 is a diagram illustrating an example of wavelength bands of WDM signals transmitted from the terminal station 11 and the terminal station 13 to the terminal station 12 in the upstream channel. In the third state, the optical filter module 35 allows both optical signals in the wavelength band C and in the wavelength band D to pass therethrough and outputs the optical signals to the optical coupler 34. Then, in the third state, the optical filter module 36 blocks both of the optical signals in the wavelength band C and the wavelength band D. In other words, in the third state, all the WDM signals output from the terminal station 11 are transmitted in the direction to the terminal station 12, and the WDM signal output from the terminal station 13 is not transmitted to the terminal station 12.

In the fourth state, the optical filter module 35 allows only an optical signal in the wavelength band C to pass therethrough and outputs the optical signal to the optical coupler 34, and blocks an optical signal in the wavelength band D. On the other hand, in the fourth state, the optical filter module 36 allows the optical signal in the wavelength band D to pass therethrough and outputs the optical signal to the optical coupler 34 while blocking the optical signal in the wavelength band C. In other words, in the fourth state, the signal in the wavelength band C of the WDM signal output from the terminal station 11 and the signal in the wavelength band D of the WDM signal output from the terminal station 13 are transmitted to the terminal station 12.

In the third state, the optical filter modules 35 and 36 are controlled almost simultaneously, and thereby the upstream channel of the submarine branching device 10 also shifts to the fourth state as illustrated in FIG. 8. In this way, the submarine branching device 10 can switch an add ratio of the input WDM signal by wavelength band basis and change the add ratio in upstream signals.

The configuration of the optical filter modules 35 and 36 used in the upstream channel is similar to that of the optical filter module 25 described in FIG. 4 except for the characteristics of the optical filter, and therefore description will be omitted.

Switching in the upstream channel will be described with reference to FIG. 6 again by taking switching from the third state to the fourth state as an example. When the amount of attenuation of the variable optical attenuator 33 is increased prior to the switching operation of the optical filter modules 35 and 36, the optical power of the WDM signal output from the submarine branching device 10 to the submarine repeater 52 is almost zero ("a" in FIG. 6). As a result, output of the WDM signal in the wavelength bands C and D to the submarine repeater 52 in the third state also stops. The optical switch 254 of both of the optical filter modules 35 and 36 is switched during "b" in FIG. 6. After the switching ends, the amount of attenuation of the variable optical attenuator 33 is gradually reduced ("c" in FIG. 6), and the optical output power is restored to the optical output power before the switching by the optical switch 254 ("d" in FIG. 6). As a result, the optical power of the optical signal in the wavelength band C output from the submarine branching device 10 to the submarine repeater 52 and the optical signal in the wavelength band D output to the submarine repeater 53 is gradually increased when communication in the fourth state starts.

In this way, also in the upstream channel, the optical output power of the optical signals after the switching by the optical switch 254 is gradually increased by controlling the variable optical attenuator 33, and thereby occurrence of an optical surge due to the switching by the optical switch 254 can be suppressed in the device on the subsequent stage of the submarine branching device 10.

Figure 9:
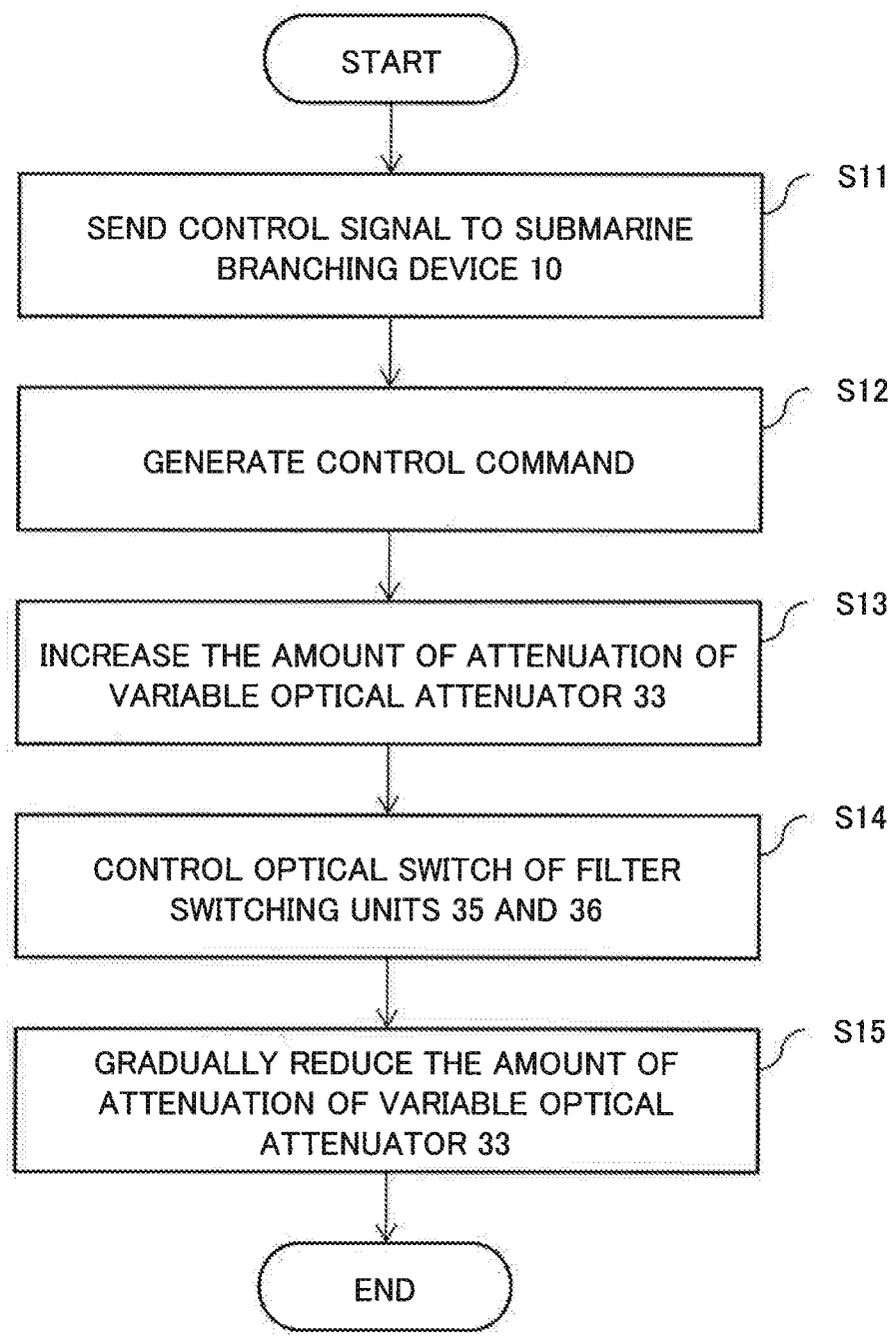
FIG. 9 is a flowchart illustrating an example of a switching procedure in the upstream channel.
Figure 10:
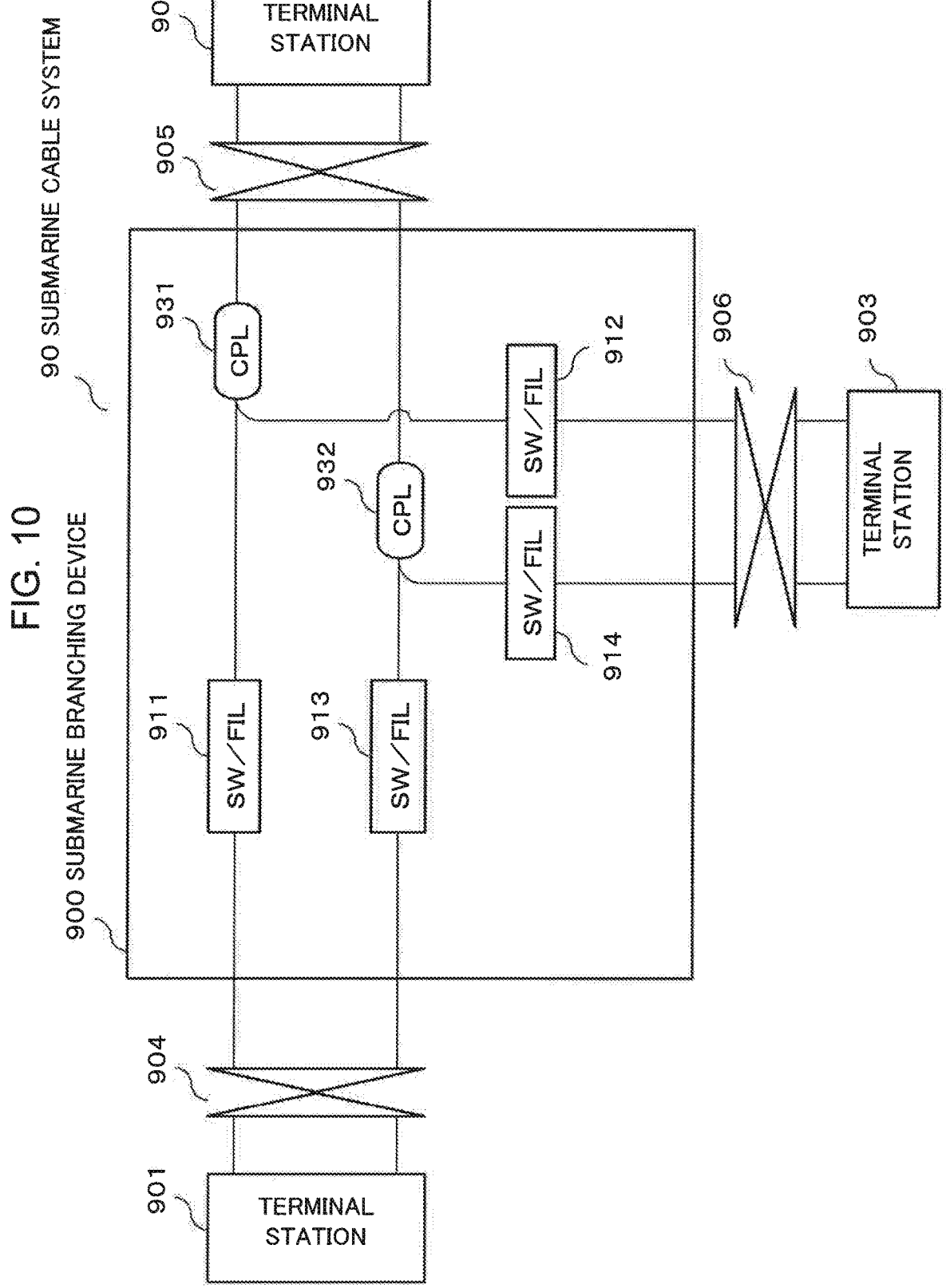
FIG. 10 is a block diagram illustrating a configuration of a general submarine cable system.
Figure 11:
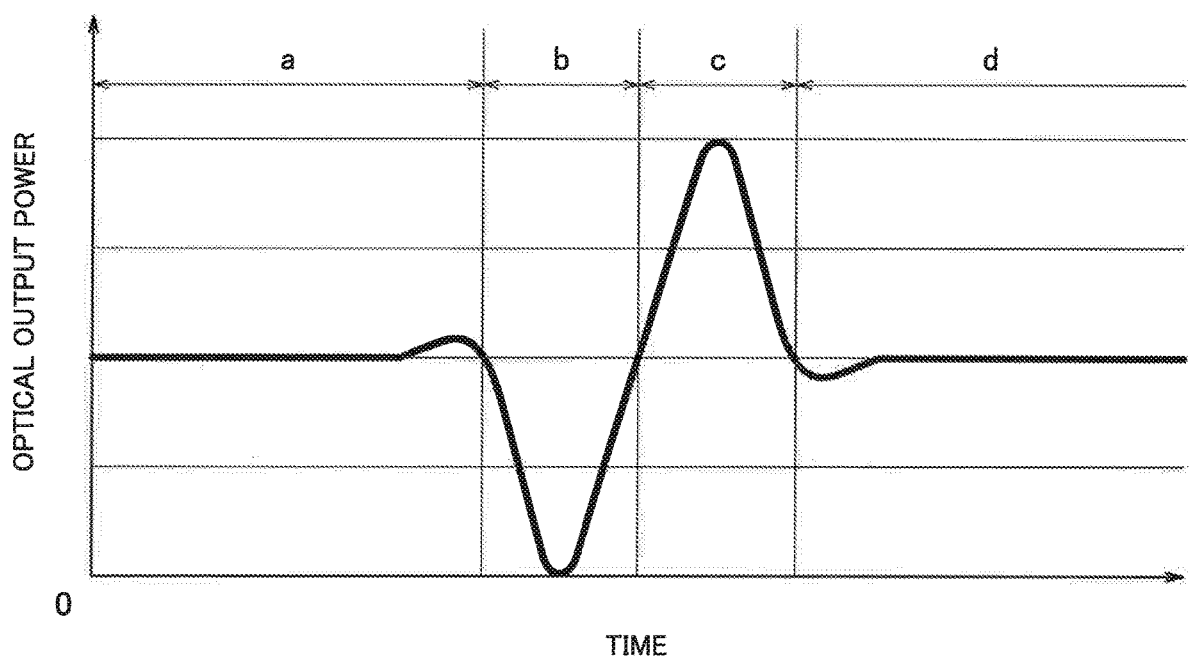
FIG. 11 is a diagram illustrating an example of an optical waveform output from an optical amplifier included in a submarine repeater on a subsequent stage.

FIG. 9 is a flowchart illustrating an example of a switching procedure in the upstream channel by the optical filter modules 35 and 36 described above. The terminal station 11 sends, to the submarine branching device 10, a control signal instructing control of switching by the optical filter modules 35, 36 and the amount of attenuation of the variable optical attenuator 33 (Step S11 in FIG. 9). The control unit 42 generates a control command for controlling the optical filter modules 35, 36 and the variable optical attenuator 33 from the control signal included in the WDM signal received by the reception unit 41 (Step S12). Note that, the terminal station 13 may send the control signal in the upstream channel. In this case, for example, an optical coupler is provided prior or subsequent to the optical amplifier 37 and a WDM signal branched by the optical coupler is received by the reception unit 41, and thereby the submarine branching device 10 can be controlled based on the control signal sent from the terminal station 13.

The wavelength bands of the WDM signal transmitted among the terminal stations 11 to 13 can be switched (that is, an add/drop ratio can be switched) by simultaneously performing the switching procedure in the downstream channel described in FIG. 7 and the switching procedure in the upstream channel described in FIG. 9. In this case, the variable optical attenuators 23 and 33 are controlled in such a way as to reduce the optical power of the WDM signal output from the submarine branching device 10 before switching in each of the optical filter modules, and to gradually increase the optical power of the WDM signal output from the submarine branching device 10 after the switching. As a result, the submarine branching device 10 in the second example embodiment can suppress occurrence of an optical surge due to switching caused by changing the add/drop ratio in the optical device connected on the subsequent stage. Then, this effect can be obtained without depending on a type of optical switch used in each of the optical filter modules 25, 26, 35, and 36.

Modification Example of Second Example Embodiment

In the submarine branching device 10 in the second example embodiment, the variable optical attenuators 23 and 33 control the optical power of the WDM signal as exemplified in FIG. 6. However, control of the optical power of the WDM signal may be performed by using the optical amplifiers 22, 32, and 37. For example, when the optical output power is reduced or increased in FIG. 6, optical power of pumping source that excites the optical amplifiers 22, 32, and 37 may be reduced or increased as necessary. Control of the optical power of the pumping source can be performed by controlling a drive current of a pumping laser diode. In this way, the control of the optical power of the WDM signal can be realized by controlling the variable optical attenuators and controlling the optical power of the pumping source.

Such a means for controlling the optical power of the WDM signal corresponds to the variable output unit 102 of the optical control devices 100 and 200 in the first example embodiment. Further, the optical filter modules 25, 26, 35, and 36 in the second example embodiment correspond to the switching unit 101. The operation of switching between the optical filters 252 and 253 in the optical filter modules 25, 26, 35, and 36 corresponds to the operation of switching the input first light in such a way that the first light passes through any one of the optical paths inside and outputting the first light in the optical control devices 100 and 200. In other words, the optical control device 100 in the first example embodiment is also included in the submarine branching device 10 in the second example embodiment.

In the second example embodiment, the control unit 42 may include a function of monitoring a feeding current to the submarine branching device 10. Then, when the feeding current is changed to greater than or equal to a predetermined value, the operation of switching an optical path of a WDM signal may be performed. For example, when a current fed from the terminal station 11 to the submarine branching device 10 is cut or greatly reduced, an abnormality may have occurred in a feed line between the terminal station 11 and the submarine branching device 10 or a feed device of the terminal station 11. In such a case, the control unit 42 may interrupt communication with the terminal station 11 connected to a transmission path in which the abnormality of the fed current is detected, and may autonomously switch among the optical filter modules 25, 26, 35, and 36 in such a way as to transmit a WDM signal only between the terminal station 13 and the terminal station 12.

In the second example embodiment, a wavelength selective switch (WSS) including functions of selecting and switching a WDM signal may be used as the optical filter modules 25, 26, 35 and 36. Furthermore, when a WSS including a function of adjusting an optical output can be used, the WSS may be used instead of the optical filter modules 25, 26, 35, and 36 and the variable optical attenuators 23 and 33. One WSS may be used to replace a part of or the whole optical filter modules and variable optical attenuators included in the submarine branching device 10.

In the second example embodiment, the operation of shifting from the first state to the second state and the operation of shifting from the third state to the fourth state are described. However, it is clear that the effect of suppressing an optical surge is also obtained when the second state is shifted to the first state and the fourth state is shifted to the third state.

Further, the wavelength bands A to D are examples, and a combination of wavelength bands branched into the terminal station 11 and the terminal station 13 or wavelength bands coupled by the optical coupler 34 and sent to the terminal station 12 is arbitrary configured. For example, the submarine branching device 10 may branch a wavelength band or couple wavelength bands selected from a WDM signal having three or more wavelength bands. Further, branching and coupling of the WDM signal is not limited in wavelength band units. For example, an optical signal selected in carrier wavelength units may be split into the terminal stations 11 and 13. WDM signals received from the terminal stations 11 and 13 may be selected in carrier wavelength units and coupled, and then transmitted to the terminal station 12.

In the second example embodiment, the configuration capable of suppressing an optical surge in the submarine cable system is described. However, the technique in the present example embodiment is applicable to general optical cable communication systems other than the submarine cable system.

The functions and procedures described in each of the example embodiments above may be realized by a program executed by a central processing unit (CPU) included in the location of the control unit 42 or the submarine branching device 10 in the second example embodiment. The program is recorded in a tangible and non-transitory recording medium. A semiconductor memory or a fixed magnetic disk device is used as the recording medium, which is not limited thereto. The recording medium may be included inside the CPU. In the first example embodiment, the CPU and memory may be included as a control unit in the optical control device 100 or 200.

Note that, the example embodiments of the present invention may also be described as supplementary notes below. However, the example embodiments are not limited thereto.

(Supplementary Note 1)

An optical control device configured to process input first light and output second light, the optical control device including:

a switching means for switching and outputting the first light subjected to selected processing; and a variable output means for reducing optical power of the second light before the switching by the switching means is executed and gradually increasing the optical power of the second light after the switching is executed, the variable output means being connected in series to the switching means.

(Supplementary Note 2)

The optical control device according to supplementary note 1, wherein a gradual increase in the optical power of the second light is controlled in such a way that an optical surge occurring due to the switching in an external device to which the second light is input is less than or equal to a predetermined level.

(Supplementary Note 3)

The optical control device according to supplementary note 1 or 2, wherein the variable output means includes a variable optical attenuator.

(Supplementary Note 4)

The optical control device according to any one of supplementary notes 1 to 3, wherein the variable output means includes an optical amplifier configured to change an output, and the optical power of the second light is controlled by controlling excitation power of the optical amplifier.

(Supplementary Note 5)

The optical control device according to any one of supplementary notes 1 to 4, further including:

a control means for controlling the variable output means and the switching means.

(Supplementary Note 6)

The optical control device according to any one of supplementary notes 1 to 5, wherein connection is made in such a way that the first light is input to the variable output means, light output from the variable output means is input to the switching means, and the second light is output from the switching means.

(Supplementary Note 7)

The optical control device according to any one of supplementary notes 1 to 5, wherein connection is made in such a way that the first light is input to the switching means, light output from the switching means is input to the variable output means, and the second light is output from the variable output means.

(Supplementary Note 8)

The optical control device according to any one of supplementary notes 1 to 7, wherein the switching means includes an optical switch.

(Supplementary Note 9)

An optical branching device to which a first terminal station, a second terminal station, and a third terminal station are connected, the optical branching device including:

the optical control device according to supplementary note 6, wherein an optical signal sent from the second terminal station is input to the variable output means of the optical control device, the variable output means is configured to reduce optical power of an optical signal output from the switching means before the switching means switches a terminal station as a destination of an output signal output to the switching means from the variable output means, and gradually increase optical power of an optical signal output from the switching means after the switching, and an optical signal output from the switching means is sent to at least one of the first terminal station and the third terminal station.

(Supplementary Note 10)

An optical branching device to which a first terminal station, a second terminal station, and a third terminal station are connected, the optical branching device including:

the optical control device according to supplementary note 7, wherein at least one of an optical signal sent from the first terminal station and an optical signal sent from the third terminal station is input to the switching means of the optical control device, the variable output means is configured to reduce optical power of an optical signal output from the variable output means before the switching means switches an optical signal output to the variable output means, and gradually increase optical power of an optical signal output from the variable output means after the switching, and an optical signal output from the variable output means is sent to the second terminal station.

(Supplementary Note 11)

The optical branching device according to supplementary note 9 or 10, wherein the optical branching device further includes a function of monitoring a feeding current from the first to third terminal stations, and the optical control device is controlled based on a monitor result of the feeding current.

(Supplementary Note 12)

A communication system including:

a first terminal station;

a second terminal station;

a third terminal station; and the optical branching device according to any one of supplementary notes 9 to 11.

(Supplementary Note 13)

An optical control method for processing first light and outputting second light, the optical control method including:

switching and outputting the first light subjected to selected processing;

reducing optical power of the second light before the switching is executed; and gradually increasing the optical power of the second light after the switching is executed.

(Supplementary Note 14)

The optical control method according to supplementary note 13, wherein a gradual increase in the optical power of the second light is controlled in such a way that an optical surge occurring due to the switching in an external device to which the second light is input is less than or equal to a predetermined level.

(Supplementary Note 15)

An optical control program causing a computer of an optical control device configured to process first light and output second light to execute:

a procedure of switching and outputting the first light subjected to selected processing;

a procedure of reducing optical power of the second light before the switching is executed; and a procedure of gradually increasing the optical power of the second light after the switching is executed.

(Supplementary Note 16)

The optical control program according to supplementary note 15, wherein the procedure of gradually increasing the optical power of the second light includes a procedure of controlling an optical surge occurring due to the switching in an external device to which the second light is input to be less than or equal to a predetermined level.

Although the claimed invention has been described with reference to the example embodiments, it should be understood that the claimed invention is not limited to the above-mentioned example embodiments. Various modifications that can be understood by those skilled in the art within the scope of the claimed invention may be applied to the configuration and the details of the claimed invention.

Further, the configuration described in each of the example embodiments is not necessarily exclusive. The action and effects of the present invention may be realized by a configuration combining the whole or a part of the above-described example embodiments.

This application is based upon and claims the benefit of priority from Japanese patent application No. 2016-049911, filed on Mar. 14, 2016, the disclosure of which is incorporated herein in its entirety by reference.

REFERENCE SIGNS LIST 1, 90 Submarine cable system
10, 900 Submarine branching device
11 to 13, 901 to 903 Terminal station
21, 24, 31, 34, 931, 932 Optical coupler
22, 32, 37 Optical amplifier
23, 33 Variable optical attenuator
25, 26, 35, 36, 911 to 914 Optical filter module
41 Reception unit
42 Control unit
51 to 53, 904 to 906 Submarine repeater
100, 200 Optical control device
101 Switching unit
102 Variable output unit
251 Optical coupler
252, 253 Optical filter

What is claimed is:

1. An optical control device comprising:

a processor including a plural of optical filters, each of the plural of optical filters having different transmission band;

a switch configured to switch an optical path in such a way that a signal light inputted is transmitted through one of the plural of optical filters and the signal light transmitted is output as an output light; and a variable output circuit configured to reduce optical power of the output light before switching of the optical path by the switch is executed and gradually increase the optical power of the output light after the switching is executed, the variable output circuit being connected in series to the processor.

2. The optical control device according to claim 1, wherein a gradual increase in the optical power of the output light is controlled in such a way that an optical surge occurring due to the switching in an external device to which the output light is input is less than or equal to a predetermined level.

3. The optical control device according to claim 1, wherein the variable output circuit includes a variable optical attenuator.

4. The optical control device according to claim 1, wherein
   the variable output circuit includes an optical amplifier capable of changing the output power, and
   optical power of the output light is controlled by controlling excitation power of the optical amplifier.

5. The optical control device according to claim 1, further comprising
   a controller configured to control the variable output circuit and the switch.

6. The optical control device according to claim 1, wherein
   connection is made in such a way that the signal light is input to the variable output circuit, light output from the variable output circuit is input to one of the switch and the processor, and the output light is output from another of the switch and the processor.

7. The optical control device according to claim 1, wherein
   connection is made in such a way that the signal light is input to one of the switch and the processor, light output from another of the switch and the processor is input to the variable output circuit, and the output light is output from the variable output circuit.

8. The optical control device according to claim 1, wherein
   the switch includes an optical switch.

9. An optical branching device to which a first terminal station, a second terminal station, and a third terminal station are connected, the optical branching device comprising:
   the optical control device according to claim 6, wherein
   an optical signal sent from the second terminal station is input to the variable output circuit of the optical control device,
   the variable output circuit is configured to
      reduce optical power of the optical signal output from the switch before the switch selects the first terminal station or the third terminal station as a destination of an output signal output to the switch from the variable output circuit, and
      gradually increase the optical power of the optical signal output from the switch after the switching, and
   the optical signal output from the switch is sent to at least one of the first terminal station and the third terminal station.

10. An optical branching device to which a first terminal station, a second terminal station, and a third terminal station are connected, the optical branching device comprising
    the optical control device according to claim 7, wherein
    at least one of an optical signal sent from the first terminal station and an optical signal sent from the third terminal station is input to the switch of the optical control device,
    the variable output circuit is configured to
       reduce the optical power of the optical signal output from the variable output circuit before the switch switches the optical signal output to the variable output circuit, and
       gradually increase the optical power of an optical signal output from the variable output circuit after the switching, and
    the optical signal output from the variable output circuit is sent to the second terminal station.

11. The optical branching device according to claim 9, further comprising
    a function of monitoring a feeding current from the first to third terminal stations, wherein
    the optical control device is controlled based on a monitor result of the feeding current.

12. A communication system comprising:
    the first terminal station;
    the second terminal station;
    the third terminal station; and
    the optical branching device according to claim 9.

13. An optical control method comprising:
    switching an optical path in such a way that a signal light inputted is transmitted through one of a plural of optical filters, each of the plural of optical filters having different transmission band, and that the signal light transmitted is output as an output light;
    reducing optical power of the output light before the switching is executed; and
    gradually increasing the optical power of the output light after the switching is executed.

14. The optical control method according to claim 13, wherein
    a gradual increase in the optical power of the output light is controlled in such a way that an optical surge occurring due to the switching in an external device to which the output light is input is less than or equal to a predetermined level.

15. A tangible and non-transitory recording medium recording an optical control program that causes a computer of an optical control device, to execute:
    a procedure of switching an optical path in such a way that a signal light inputted is transmitted through one of a plural of optical filters, each of the plural of optical filters having different transmission band, and that the signal light transmitted is output as an output light;
    a procedure of reducing optical power of the output light before the switching is executed; and
    a procedure of gradually increasing optical power of the output light after the switching is executed.

16. The tangible and non-transitory recording medium according to claim 15, wherein
    the procedure of gradually increasing optical power of the output light includes a procedure of controlling an optical surge occurring due to the switching in an external device to which the output light is input in such a way as to be less than or equal to a predetermined level.

* * * * *